United States Patent [19]

McLarty

[11] Patent Number: 5,074,679
[45] Date of Patent: Dec. 24, 1991

[54] BALL BEARING RETAINER

[75] Inventor: Daniel R. McLarty, Burlington, Conn.

[73] Assignee: The Torrington Company, Torrington, Conn.

[21] Appl. No.: 631,133

[22] Filed: Dec. 20, 1990

[51] Int. Cl.⁵ ............................................. F16C 33/38
[52] U.S. Cl. .................................... 384/526; 384/531
[58] Field of Search ............... 384/526, 531, 532, 527, 384/523, 534

[56] References Cited

U.S. PATENT DOCUMENTS

| | | |
|---|---|---|
| 980,082 | 12/1910 | Eitner . |
| 2,557,476 | 6/1951 | Schwitter . |
| 3,436,135 | 4/1969 | Bomberger . |
| 4,019,790 | 4/1977 | Earsley et al. . |
| 4,040,687 | 8/1977 | Rogers . |
| 4,136,915 | 1/1979 | Derner . |
| 4,278,307 | 7/1981 | Olschewski et al. . |
| 4,324,444 | 4/1982 | Buczynski et al. . |
| 4,938,613 | 7/1990 | Griffin et al. ........................ 384/526 |
| 4,941,759 | 7/1990 | Dreschmann et al. .............. 384/531 |

*Primary Examiner*—Lenard A. Footland
*Attorney, Agent, or Firm*—Michael H. Minns

[57] ABSTRACT

A ball bearing retainer in the form of a unitary molded plastic ring with a plurality of ball receiving pockets spaced circumferentially about the ring. The ball receiving pockets have a generally truncated spherical shape. The pockets have at least two prongs located about the pocket for retaining a ball in the pocket.

19 Claims, 2 Drawing Sheets

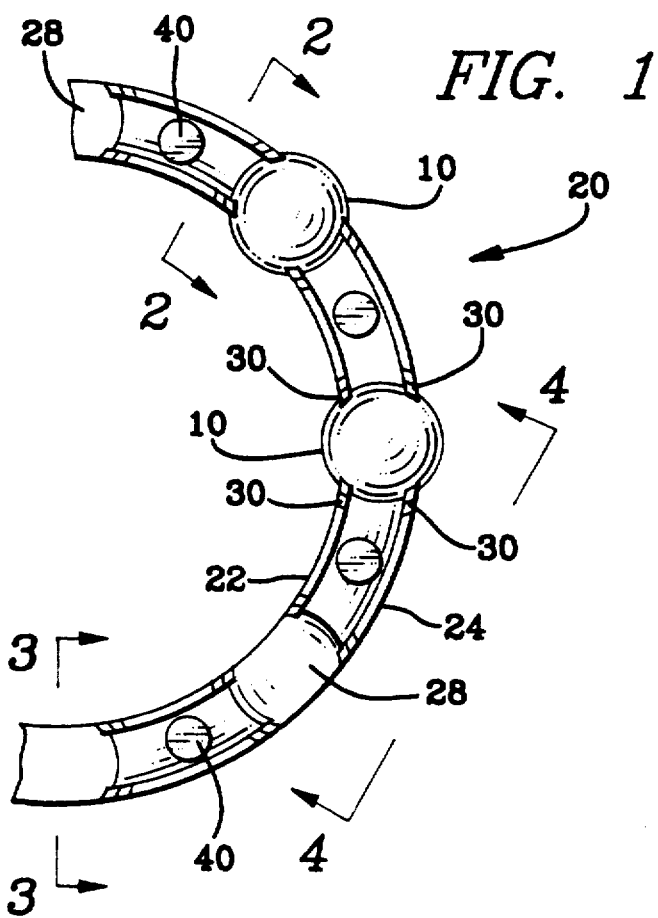
FIG. 1
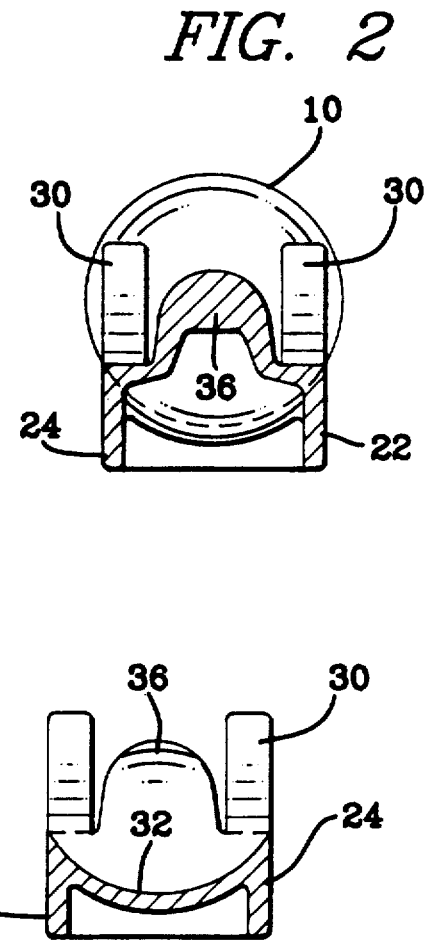
FIG. 2
FIG. 3
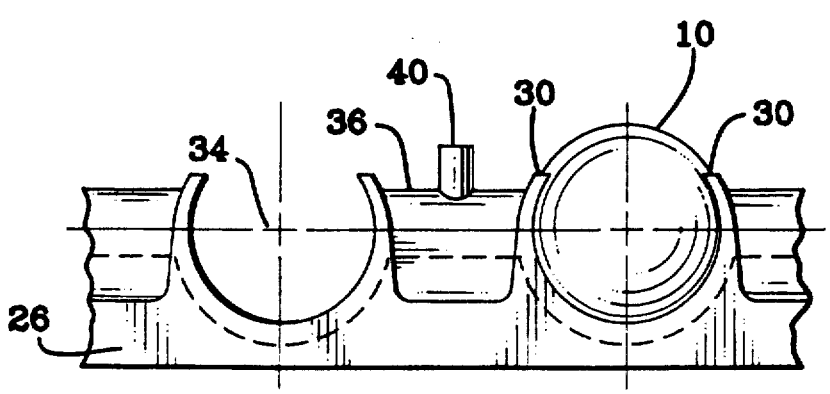
FIG. 4

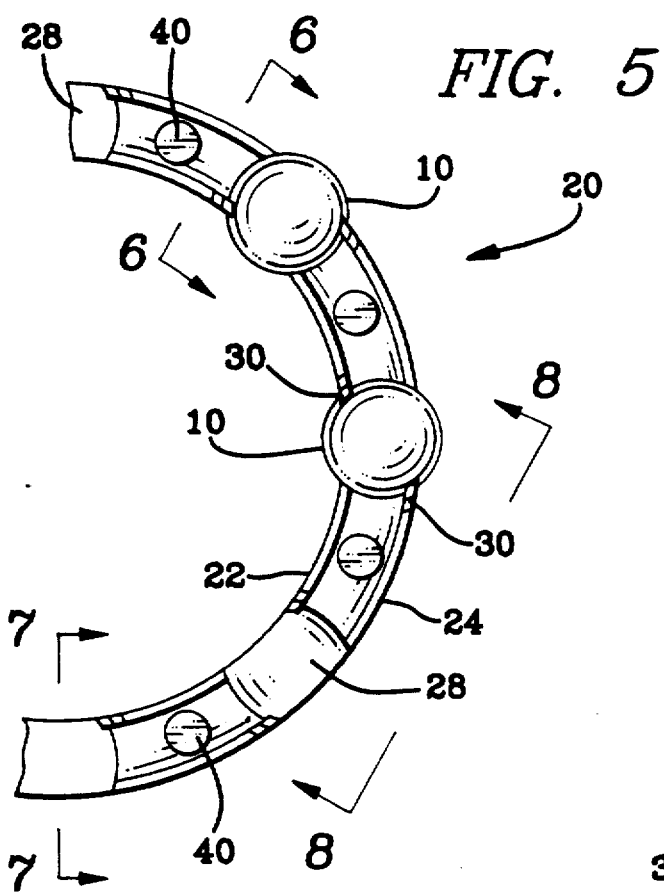
FIG. 5
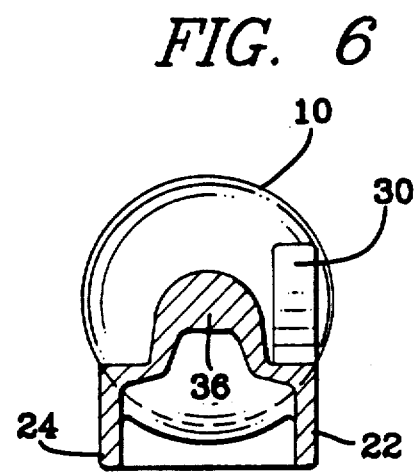
FIG. 6
FIG. 7
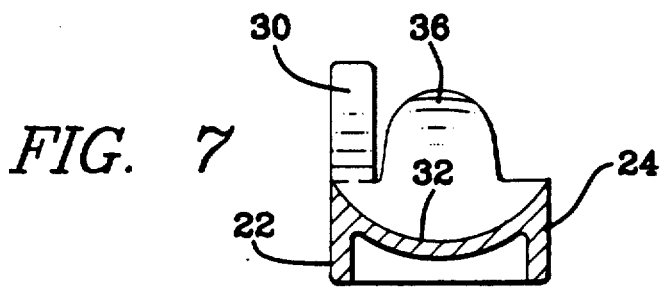
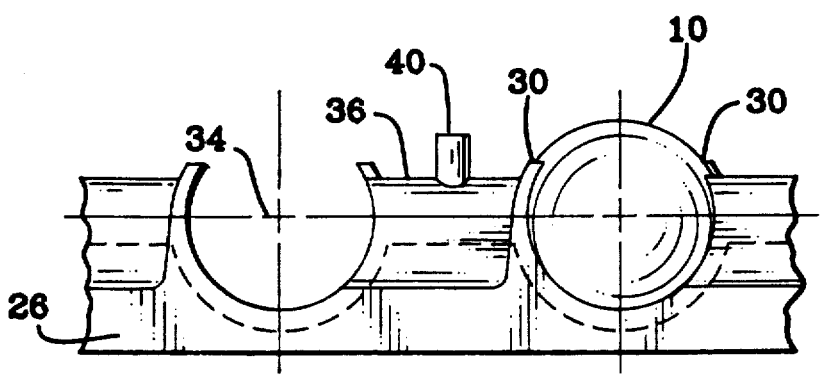
FIG. 8

BALL BEARING RETAINER

BACKGROUND OF THE INVENTION

This invention relates generally to a ball bearing retainer and more particularly to a retainer in the form of a unitary molded plastic ring having a plurality of ball bearing pockets.

Molded plastic ball bearing retainers normally have a plurality of ball receiving pockets that are essentially a truncated, spherical concave section. The retainer spherically wraps around a portion of the ball to retain the ball within the pocket. The spherical portion of the retainer stiffens the retainer. This contributes to fatigue failure of the retainer.

To improve the fatigue life and flexibility of molded plastic ball bearing retainers, the spherical portion has been replaced with flexible flanges that extend up from a base portion of the retainer. Because the newer, higher temperature plastics currently being used have a higher modulus of elasticity, the material between the ball receiving pockets must be relieved to assure that the flanges have sufficient flexibility to allow the ball to be inserted. If the material is relieved to below the ball centerline, compressive forces from adjacent balls during bearing operation may cause fatigue failure of the retainer.

The foregoing illustrates limitations known to exist in present ball bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a ball bearing retainer comprising a ring having a plurality of ball receiving pockets for retaining a ball within each pocket, the ball receiving pockets being circumferentially spaced about the ring and having pocket entrance openings which open axially of the ring in a direction opposite from a base portion of the ring. The entrance openings defined between at least two opposed outwardly yielding prongs having prong tips spaced apart a distance less than the diameter of the balls, each prong having an oblong cross-section whereby the length of the side adjacent the ball receiving pocket is less than one-half of the ring width.

The foregoing and other aspects will become apparent from the following detailed description of the invention when considered in conjunction with the accompanying drawing figures.

BRIEF DESCRIPTION OF THE DRAWING FIGURES

FIG. 1 is a side elevational view illustrating an embodiment of a ball bearing retainer with two bearing balls shown in phantom.

FIG. 2 is a cross-section that has been taken on the line 2—2 of FIG. 1.

FIG. 3 is a cross-section that has been taken on the line 3—3 of FIG. 1.

FIG. 4 is a partial plan view of the ball bearing retainer as viewed in the direction of arrows 4—4 of FIG. 1.

FIG. 5 is a side elevational view illustrating a second embodiment of a ball bearing retainer with a bearing ball shown in phantom.

FIG. 6 is a cross-section that has been taken on the line 6—6 of FIG. 5.

FIG. 7 is a cross-section that has been taken on the line 7—7 of FIG. 5.

FIG. 8 is a partial plan view of the ball bearing retainer as viewed in the direction arrows 8—8 of FIG. 5.

DETAILED DESCRIPTION

FIG. 1 shows the preferred embodiment of a ball bearing retainer 20, in the form of a unitary molded plastic ring with a central axis 21. The retainer 20 has an inner peripheral edge 22 and an outer peripheral edge 24 that are radially spaced about the central axis 21. A base portion 26 extends radially between the inner peripheral edge 22 and the outer peripheral edge 24. A plurality of ball receiving pockets 28 that open axially of the retainer ring in a direction opposite from the base portion 26 are circumferentially spaced about the ball bearing retainer 20. These pockets 28 are adapted to hold spherical bearing balls 10, as indicated in two of the pockets 28 shown in FIG. 1.

The base portion 26 that is adjacent each ball receiving pocket 28 defines a seat 32 having a generally truncated, spherical concave surface as shown in FIGS. 1 and 3. The pockets 28 are further defined by two pairs of prongs 30 that are disposed on opposite sides of the ball receiving pockets 28. These prongs 30 extend from the base portion 26, in a generally axial direction as shown in FIG. 4, toward the pocket entrance opening. The prongs 30 have truncated spherical concave surfaces coincident with and in extension of the truncated spherical concave seat 32 of the pocket 28. The width of the prong 30 is less than one-half the width of the retainer 20 from the inner peripheral edge 22 to the outer peripheral edge 24. In the preferred embodiment, as shown in FIG. 2, the width of the prongs 30 is substantially less than one-half the width of the retainer 20. This reduction in the width of the prongs 30 increases the flexibility of the prongs 30. The tips of the prongs 30 are spaced apart a distance less than the diameter of the bearing balls 10.

The base portion 26 between the ball receiving pockets 28 contains a support portion 36 that is located about the centerline 34 of the balls 10. This support portion 36 resists compressive forces from the balls 10 in adjacent pockets 28 during bearing operation. The surface of the support portion 36 adjacent the ball receiving pocket 28 has a generally truncated spherical concave surface to match the surfaces of the seat 32 and the prongs 30. The cross-sectional area of the base portion 26 below the support portion 36 and the seat 32 is relieved as shown in FIGS. 2 and 3. This improves the flexibility of the retainer 20.

Located between each ball receiving pocket 28 is an axially extending circular pin 40 which serves as a bearing area for ejector pins for ejecting the ball bearing retainer from a mold. This pin 40 can also be located in the relieved area between ball receiving pockets 28.

A second embodiment is shown in FIGS. 5 through 8. This second embodiment uses two prongs 30 that are diagonally opposed about the ball receiving pocket 28 rather than the two pairs of prongs 30 as shown in FIGS. 1 through 4.

Having described the invention, what is claimed is:

1. A ball bearing retainer comprising:

a ring having a central axis, an inner peripheral edge radially spaced about the axis, an outer peripheral edge radially spaced about the axis, a base portion extending between said inner and outer peripheral edges of the ring, the distance between the inner and outer peripheral edges defining a ring width, and a plurality of ball receiving pockets for retaining a ball within each pocket, the ball receiving pockets being circumferentially spaced about the ring and having pocket entrance openings which open axially of the ring in a direction opposite from the base portion, said entrance openings defined between at least two opposed outwardly yielding prongs having prong tips spaced apart a distance less than the diameter of the balls, each prong having an oblong cross-section whereby the length of the side adjacent the ball receiving pocket is less than one-half of the ring width.

2. A ball bearing retainer as in claim 1, wherein the number of prongs is two, the first prong is located adjacent the inner edge of the ring and the second prong is located adjacent the outer edge of the ring and is diagonally opposite the first prong.

3. A ball bearing retainer as in claim 1, wherein the number of prongs is four, two prongs are located adjacent the outer edge of the ring and two prongs are located adjacent the inner edge of the ring.

4. A ball bearing retainer as in claim 1, wherein the length of the side of the oblong cross-section of the prong adjacent the ball receiving pocket is substantially less than one-half the ring width.

5. A ball bearing retainer as in claim 1, wherein the ring has a support portion between adjacent ball receiving pockets, the support portion being located about the centerline of the balls to be retained within the ball receiving pockets whereby the support portion resists compressive forces from adjacent balls.

6. A ball bearing retainer as in claim 5, wherein the areas of the base portion of the ring axially adjacent the ball receiving pockets and the support portion are relieved, 7. A all bearing retainer as in claim 5, wherein each prong and each support portion are separate extensions projecting axially from the base portion, whereby a radial gap exists between a prong and the adjacent support portion.

8. A ball bearing retainer comprising:

a ring having a central axis, an inner peripheral edge radially spaced about the axis, an outer peripheral edge radially spaced about the axis, a base portion extending between said inner and outer peripheral edges of the ring, the distance between the inner and outer peripheral edges defining a ring width, and a plurality of ball receiving pockets circumferentially spaced about the ring, each pocket having a generally truncated spherical concave seat for retaining a ball within each pocket and having at least two opposed outwardly yielding prongs, the prongs having truncated spherical surfaces coincident with and in extension of the truncated spherical concave seat of the pocket and having prong tips, each prong having an oblong cross-section whereby the length of the side adjacent the ball receiving pocket is less than one-half the ring width, the pockets also having pocket entrance openings which open axially of the ring in a direction opposite from the base portion, said entrance openings defined between the prong tips which are spaced apart a distance less than the diameter of the balls.

9. A ball bearing retainer as in claim 8, wherein the number of prongs is four, two prongs are located adjacent the outer edge of the ring and two prongs are located adjacent the inner edge of the ring.

10. A ball bearing retainer as in claim 8, wherein the length of the side of the oblong cross-section of the prong adjacent the ball receiving pocket is substantially less than one-half the ring width.

11. A ball bearing retainer as in claim 8, wherein the ring has a support portion between adjacent ball receiving pockets, the support portion being located about the centerline of the balls to be retained within the ball receiving pockets whereby the support portion resists compressive forces from adjacent balls.

12. A ball bearing retainer as in claim 11, wherein the areas of the base portion of the ring axially adjacent the ball receiving pockets and the support portion are relieved, thereby increasing the flexibility of the ring.

13. A ball bearing retainer as in claim 11, wherein each prong and each support portion are separate extensions projecting axially from the base portion, whereby a radial gap exists between a prong and the adjacent support portion.

14. A ball bearing retainer as in claim 8, wherein the number of prongs is two, the first prong is located adjacent the inner edge of the ring and the second prong is located adjacent the outer edge of the ring and is diagonally opposite the first prong.

15. A ball bearing retainer comprising:

a ring having a central axis, an inner peripheral edge radially spaced about the axis, an outer peripheral edge radially spaced about the axis, a base portion extending between said inner and outer peripheral edges of the ring, the distance between the inner and outer peripheral edges defining a ring width, and a plurality of ball receiving pockets circumferentially spaced about the ring, each pocket having a generally truncated spherical concave seat for retaining a ball within each pocket and having at least two opposed outwardly yielding prongs, the prongs having truncated spherical surfaces coincident with and in extension of the concave seat of the pocket and having prong tips, ach prong having an oblong cross-section whereby the length of the side adjacent the ball receiving pocket is substantially less than one-half the ring width, the pockets also having pocket entrance openings which open axially of the ring in a direction opposite from the base portion, said entrance openings defined between the prong tips which are spaced apart a distance less than the diameter of the balls and the ring having a support portion between adjacent ball receiving pockets, the support portion being located about the centerline of the balls to be retained within the ball receiving pockets whereby the support portion resists compressive forces from adjacent balls.

16. A ball bearing reatiner as in claim 15, wherein the areas of the base portion of the ring axially adjacent the ball receiving pockets and the support portion are relieved, thereby increasing the flexibility of the ring.

17. A ball bearing retainer as in claim 15, wherein the number of prongs is two, the first prong is located adjacent the inner edge of the ring and the second prong is located adjacent the outer edge of the ring and is diagonally opposite the first prong.

18. A ball bearing retainer as in claim 15, wherein the number of prongs is four, two prongs are located adjacent the outer edge of the ring and two prongs are located adjacent the inner edge of the ring.

19. A ball bearing retainer as in claim 15, wherein each prong and each support portion are separate extensions projecting axially from the base portion, whereby a radial gap exists between a prong and the adjacent support portion.

* * * * *